United States Patent [19]
Mao

[11] 3,879,009
[45] Apr. 22, 1975

[54] MOLD FOR MAKING OBJECTS

[75] Inventor: George W. Mao, St. Paul, Minn.

[73] Assignee: Gould Inc., Mendota Heights, Minn.

[22] Filed: May 16, 1973

[21] Appl. No.: 360,915

Related U.S. Application Data

[62] Division of Ser. No. 175,122, Aug. 26, 1971, Pat. No. 3,779,816.

[52] U.S. Cl. ............... 249/135; 106/38.27; 264/337
[51] Int. Cl. ............................................. B22c 1/00
[58] Field of Search ......... 106/38.27, 38.2; 148/6.3, 148/31.5; 117/99, 129, 5.3; 264/338, 337; 249/135

[56] References Cited
UNITED STATES PATENTS

| | | | |
|---|---|---|---|
| 3,136,011 | 6/1964 | Peras | 106/38.2 |
| 3,446,643 | 5/1969 | Karlak | 106/38.27 |

*Primary Examiner*—Allan Lieberman
*Attorney, Agent, or Firm*—Wolfe, Hubbard, Leydig, Voit & Osann, Ltd.

[57] ABSTRACT

A mold for forming objects such as battery grids includes a cavity having a titanium layer with an adherent titanium oxide layer integrally formed thereon. The oxide layer is formed by heating the titanium layer under controlled oxidizing conditions to provide an oxide layer of a specified thickness which is tenaciously adherent to the unoxidized titanium.

4 Claims, 3 Drawing Figures

MOLD FOR MAKING OBJECTS

This is a division of application Ser. No. 175,122, filed Aug. 26, 1971 and now U.S. Pat. No. 3,779,816.

This invention relates to forming objects and, more particularly, to a mold for forming objects such as battery grids and the like, a method for making such molds and a method of forming objects utilizing the mold.

Battery grid casting is typically carried out on a semi-continuous basis; and, from an economic standpoint, it is desirable to employ a method which allows formation of the grid with a minimum cycle time yet which controls the freezing or solidifying of the metal so that a complete grid is formed. Typically, the cycle time may vary from perhaps one grid per minute for a large industrial battery grid to 10 to 15 grids per minute for automotive batteries. Another requirement in casting operations of this type is that the formed grid must be able to be readily released from the mold surface.

Cast iron is the typical material used for such molds but does not adequately satisfy the requirements identified herein; and, for this reason, it is conventional practice to coat battery grid molds with various types of coatings in an attempt to provide the necessary mold surface characteristics for the grid casting operations. A widely used coating composition for gravity-type molds includes cork dust and clay suspended in water and sodium silicate. In the case of pressure die casting, a mold release agent such as silicone grease is generally required for each casting cycle. While such compositions function in an adequate manner, the frequency with which they must be reapplied (every 3 or 4 hours in the case of gravity-type mold coats) significantly reduces the attainable production rate.

It is accordingly an object of the present invention to provide a mold for forming objects which obviates the necessity of applying a coating to the mold surface yet which possesses advantageous characteristics in forming applications. A related object lies in the provision of a mold that may be used for a long period, in relation to presently used molds, without requiring interruption of casting to treat the mold surface to restore the necessary properties for casting.

Yet another object provides a mold having a surface which allows the formed object to be readily removed therefrom following the casting operation.

A further object of the present invention is to provide a mold having a surface which enhances the physical and chemical properties of the cast object. A related and more specific object provides a mold which imparts a smooth surface finish to the casting. A further related object provides castings characterized by relatively large grain size and, thus, desirable corrosion-resistance.

Another object is to provide a mold which allows the production of castings with more uniform dimensions or tolerances.

A still further object provides a method for forming a mold with a surface treated to provide the herein-described properties.

Another object is to provivde a method of casting which is capable of providing improved production rates and reduced downtime.

Other objects and advantages of the present invention will be apparent as the following description proceeds, taken in conjunction with the accompanying drawings in which.

Figure 1:
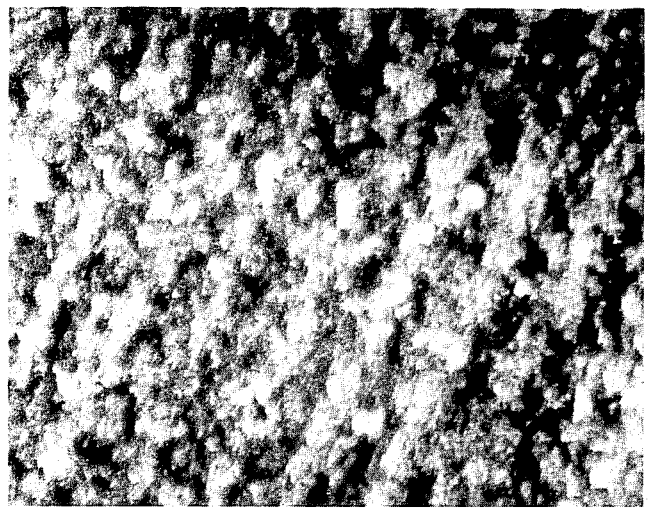
FIG. 1 is a photomicrograph (50 × amplification) of part of the surface of a mold in accordance with the present invention.

While the invention is susceptible of various modifications and alternative forms, specific embodiments thereof have been shown by way of example in the drawing and will hereafter be described in detail. It should be understood, however, that it is not intendned to limit the invention to the particular form disclosed, but, on the contrary, the intention is to cover all modifications, equivalents and alternatives falling within the spirit and scope of the invention as expressed in the appended claims. For example, the present invention is advantageously utilized in connection with the casting of battery grids; and this will be the specific use described herein. However, it should be appreciated that the present invention is equally applicable to the forming of any other object from a fluid and is further applicable to molds other than those typically used in battery grid casting operations. Thus, the present invention may be employed in the extrusion of plastics, e.g., in injection molding operations. Similarly, while the exemplary embodiment will illustrate a mold formed solely of titanium, it should be apparent that all that is required is a "facing" or layer of titanium to define the mold cavity which is of a sufficient thickness to allow the treatment necessary to form the integral oxide surface.

Briefly, the present invention is directed to a mold with a titanium surface which has been treated under specified conditions to form an integral titanium oxide layer thereon which is tenaciously adherent to the remainder of the titanium. The oxide layer, formed in accordance with the method described herein, provides the mold with characteristics which allow use in forming operations without the necessity of coating the mold as is conventionally required.

To form the mold with the oxide layer, the surface is desirably first cleaned by any conventional means, such as polishing or the like. The titanium layer is then heated in an oxidizing atmosphere to provide an oxide layer on the titanium surface which is sufficient to provide the heat-insulating properties and other characteristics needed for forming but which is also tenaciously adherent to the remainder of the titanium so as to provide a mold with excellent life for casting applications. Absent any mechanical damage, as by excessively scraping the surface to destroy the finish and/or its adherence or exposure to too high temperatures, the life of a mold made according to the present invention would be virtually without limit.

In keeping with the invention, the temperature level of the titanium mold is desirably raised to form about 1,200° to about 1,500°F. at a rate which substantially prevents the development of thermal shock in the oxide layer being built up that would substantially lessen its adherence. Temperatures below 1,200°F. can be employed but generally do not allow development of a layer of adequate thickness within acceptable time limits whereas temperatures above 1,500°F. begin to adversely affect the adherence of the titanium oxide layer to the titanium, and also create warpage of the titanium. Raising the temperature at a rate of from about 100°F. per hour to about 200°F. per hour will be a sufficiently slow rate to prevent undesirable thermal shock in most applications.

The temperature should be maintained at the maximum level for the time necessary to build up an oxide layer of sufficient thickness to satisfy the heat-insulating requirements of the particular forming operation involved. Thickness of about 0.25 to about 0.5 mil in thickness have been found suitable for battery grid casting. Thicknesses less than about 0.25 mil will generally possess inadequate properties for casting whereas thicknesses greater than about 0.5 mil tend to yield oxide layers with poor adhesion characteristics. Typically, a sufficient thickness for battery grid casting will be built up after a period of about 16 hours. It is hypothesized that the temperature of the titanium should not be varied to any significant extent once the maximum temperature has been reached because it is believed that such variation would prevent the formation of the monomorphic character of the oxide layer, which may well contribute to its ability to tightly adhere to the unoxidized portion.

The mold should desirably be completely supported in a flat position during the heating step to prevent warpage. This is particularly important when the temperatures being employed are in the higher part of the range. Any conventional type of furnace may be employed for heating, but the furnace should be "burned out" or cleaned to prevent contamination during heating which could impair the adhesion characteristics of the oxide layer.

The type of oxidizing atmosphere which is employed is not particularly critical; however, it is advantageous to use a gas stream having a definite amount of the oxidizing agent since this simplifies control over the operation. However, if desired and with proper control, even the still air in a furnace or other heating chamber could be used.

After formation of the adherent oxide layer in the desired thickness range, the heated mold is thereafter cooled at a controlled rate which is slow enough to prevent any significant thermal shock which would, as was the case in the heating step, dissipate the adhesion levels of the oxide layer to the unoxidized titanium. Cooling at a rate of from about 100° to about 400°F. per hour may be used under most conditions without impairing adhesion.

In accordance with a further aspect of the present invention, the oxide layer is subjected to a second heat treatment at a lower temperature to improve the adhesion of the oxide layer to the unoxidized titanium. To this end, and following the initial heating step, the mold is partially cooled at a rate to avoid thermal shock (e.g., 100° to 600°F./hr. has been found satisfactory) and is held at the intermediate temperature for a certain period of time. It is theorized that this second heat treatment results in oxygen diffusion from the oxide layer to the interface between that layer and the unoxidized titanium which, in effect, improves the cohesiveness of these two layers at their interface. Accordingly, this second step should be carried out by cooling to a temperature and holding for a time adequate to effect the necessary oxygen diffusion or increase in adhesion.

The twice-heated mold may then be cooled at a rate of from about 100° to about 400°F. per hour, which rates are satisfactory under most conditions to prevent the development of any significant amount of thermal shock.

Figure 2:
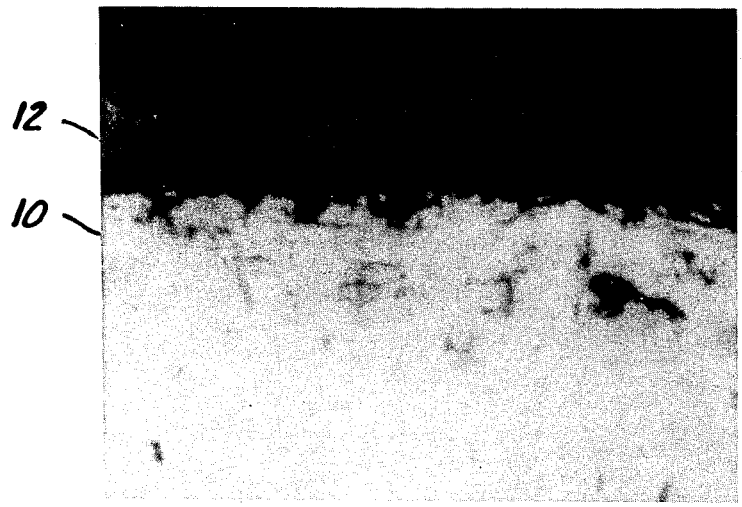
FIG. 2 is another photomicrograph (2,250 × amplification) and illustrating, in cross section fashion, a portion of the surface of the mold shown in FIG. 1.
Figure 3:
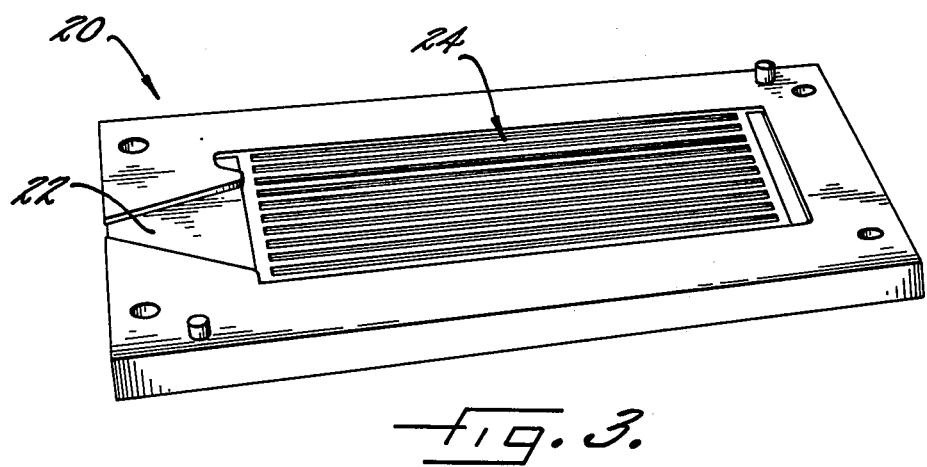
FIG. 3 is a perspective view and showing a typical mold according to the present invention which can be employed in the casting of battery grids.

The resulting mold, as can be seen in the amplified photographs identified as FIGS. 1 and 2, comprises an unoxidized portion 10 with an oxide layer 12. The oxide layer is tenaciously adherent to the unoxidized titanium. By "tenaciously adherent," it is meant that the formed layer is sufficiently adherent to withstand the operating conditions encountered in the forming or casting operations, typically for a long time in relation to presently used mold coats. FIG. 3 shows a mold section formed from titanium treated as herein described which may be used in battery grid casting. The mold section 20 comprises a gate area 22 and a cavity, shown generally at 24.

The following examples are intended to be merely illustrative of the present invention and not in limitation thereof. Examples 1 and 2 employed a rod of commercially pure titanium metal with a sample size and shape selected to simulate the cavities of a battery grid casting mold. A titanium rod one-eighth inch in diameter and 3 inches in length was used with three ⅛ inch grooves machined near one end and having a diameter of about one-sixteenth inch. Diffraction techniques indicate that the oxide layer is $TiO_2$ (Rutile form).

EXAMPLE 1

A specimen rod was cleaned by employing a polish consisting of, by volume, 10 parts hydrofluoric acid, 60 parts of a 30 percent aqueous hydrogen peroxide solution and 30 parts distilled water. The sample was cleaned for about 2 minutes.

The specimen was heated from ambient conditions to a temperature of about 1,400°F. with the heating being carried out at a rate of about 175°F. per hour in an hour in an atmosphere of, by volume, 95 percent argon and 5 percent oxygen in a Lindberg tube furnace. The argon-oxygen stream was passed through the furnace at a rate of about 1 cu. ft./hr. The temperature was held at 1,400°F. for 16 hours to provide the initial oxide layer.

A second heat treatment was then carried out in which the temperature was cooled after the first stage from 1,400° to 1,200°F. at a rate of 600°F. per hour and was held at 1,200°F. for 16 hours while maintaining a vacuum of about $5 \times 10^{-4}$mm. mercury. Thereafter cooling to ambient conditions were carried out at a rate of about 400°F. per hour.

The specimen achieved a gain in weight of about $158 \times 10^{-5}$ grams per square cenetimeter, and this corresponds to an oxide layer of about 0.3 mils in thickness. The oxide layer has very good adhesion and breaks off into only small pieces when subjected to extensive bending.

EXAMPLE 2

The specimen was treated with the polish described in Example 1; and, thereafter, was heated to a temperature of 1,500°F. from ambient conditions at a rate of 175°F. per hour in a vacuum atmosphere ($5 \times 10^{-4}$mm. mercury) in the furnace described in Example 1. The temperature was held at 1,500°F. for 16 hours after which the specimen was cooled to ambient conditions at a rate of 100°F. per hour.

A weight gain of $204 \times 10^{-5}$ grams per square centimeter was obtained (i.e. 0.4 mils in thickness), and the oxide layer was tenaciously adherent to the unoxidized portion. The oxide layer broke off only in small flakes after extensive bending.

EXAMPLE 3

A mold of titanium, suitable for casting automotive battery grids and having a length of 6 inches, a width of 5½ inches and spline depths of 0.064 inches, was sandblasted and the surface cleaned with acetone. The thus-treated mold was then exposed to the controlled conditions set forth in Example 2 (e.g., heated to 1,500°F. in a vacuum atmosphere of $5 \times 10^{-4}$mm. mercury, held at that temperature for 16 hours and cooled to ambient conditions at a rate of 100°F. per hour. The resulting oxide layer resisted repeated scratching with a sharp point.

The formed mold was placed in a conventional low pressure casting machine, and over 2,000 calcium-lead grids (0.06 percent by weight calcium) were cast. The oxide layer survived this run, and the formed grids were easily removed from the mold. Microstructures of cross-sections of a typical grid showed that the grain size was fairly uniform when compared with that of grids formed in a cast iron mold.

EXAMPLE 4

A tubular industrial grid mold with titanium inserts (one for the gate area and one for the mold cavity) were made by cleaning the surface of the inserts (as in Example 3) and thereafter forming an oxide layer thereon by treating the inserts as in Example 3.

The inserts were then bolted to a mold base to form a cavity with dimensions of: length — 18¾ inches, width — 5½ inches, depth — 3/16 inch and with 14 splines.

The mold was the titanium inserts was installed in a conventional low pressure casting machine and used to form antimony-lead grids (7 percent by weight antimony). Casting qualities were satisfactory, the mold filled well; and the cast grids were easily removed. Grids could be cast satisfactorily at rates of about 78 per 30 minute period.

Thus, as has been seen, the present invention provides a mold with a titanium layer and an integral oxide layer which has desirable properties when used in forming applications, such as casting lead-alloy battery grids. When the oxide layer is formed in accordance with the method of this invention, the layer is tenaciously adherent to the unoxidized portion and is capable of being used in molding operations for extended periods of time. The release characteristics are such that the cast object such as battery grids may be readily released or separated from the mold. Still further, the oxide layer imparts desirable properties in the cast objects; and, thus, casting may be obtained which have a smooth surface finish with desirable corrosion resistance. In contrast to mold coatings employing cork dust which may be 1 to 2 mils thick, the oxide layer has a thickness of only 0.25 to 0.5 mils so as to allow formation of cast objects of more uniform tolerances.

I claim as my invention:

1. A mold for forming objects from a fluid which comprises a cavity in the shape of the object to be formed having at least a surface facing of titanium and an integral adherent oxide layer thereon of a thickness sufficient to satisfy the heat insulating requirements for the objects being formed.

2. The mold of claim 1 wherein the titanium oxide layer has a thickness of from about 0.25 to about 0.5 mil.

3. The mold of claim 2 wherein the mold is formed of titanium.

4. A mold for forming a battery grid which comprises a pair of mating surfaces defining the shape of the battery grid, said mating surfaces having at least a surface facing of titanium and an integral adherent oxide layer thereon having a thickness of from about 0.25 to about 0.5 mil.

* * * * *